(12) United States Patent
Koci (10) Patent No.: US 9,915,190 B2
(45) Date of Patent: Mar. 13, 2018

(54) DUCTED COMBUSTION SYSTEMS UTILIZING VENTURI DUCTS

(71) Applicant: Caterpillar Inc., Peoria, IL (US)

(72) Inventor: Chad Koci, Washington, IL (US)

(73) Assignee: Caterpillar, Inc., Peoria, IL (US)

( * ) Notice: Subject to any disclaimer, the term of this patent is extended or adjusted under 35 U.S.C. 154(b) by 92 days.

(21) Appl. No.: 14/798,140

(22) Filed: Jul. 13, 2015

(65) Prior Publication Data

US 2017/0016384 A1 Jan. 19, 2017

(51) Int. Cl.
*F02B 23/10* (2006.01)
*F02B 23/02* (2006.01)
*F02F 1/24* (2006.01)

(52) U.S. Cl.
CPC ............. *F02B 23/10* (2013.01); *F02B 23/02* (2013.01); *F02F 1/24* (2013.01); *Y02T 10/125* (2013.01)

(58) Field of Classification Search
CPC ........ F02B 3/00; F02B 23/0627; F02B 23/00; F02B 23/10; F02B 2023/103; F02B 2023/0612; F02B 23/0645; F02B 23/04648; F02B 23/0651; F02B 23/0669; F02B 23/0678; F02B 19/14; F02F 3/28; F02M 61/1806; F02M 55/00; F02M 61/14; F02M 61/1833; F02M 55/008; F02M 57/00; F02D 41/3005
USPC ....... 123/262, 267, 268, 274, 277, 278, 280, 123/285, 286, 288, 298, 429, 432, 437, 123/439
See application file for complete search history.

(56) References Cited

U.S. PATENT DOCUMENTS

| | | | | | |
|---|---|---|---|---|---|
| 1,594,773 | A | * | 8/1926 | French | F02M 69/00 123/268 |
| 1,679,832 | A | * | 8/1928 | Lang | F02B 19/04 123/275 |
| 1,759,160 | A | * | 5/1930 | Lang | F02B 19/04 123/276 |
| RE17,775 | E | * | 8/1930 | Dorner | F02B 23/00 123/276 |

(Continued)

FOREIGN PATENT DOCUMENTS

| | | |
|---|---|---|
| CN | 101382109 A | 3/2009 |
| DE | 19838771 A1 | 3/2000 |

(Continued)

*Primary Examiner* — Stephen K Cronin
*Assistant Examiner* — Susan Scharpf
(74) *Attorney, Agent, or Firm* — Miller, Matthias & Hull (57) ABSTRACT

A ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector, having at least one orifice, injecting fuel into the combustion chamber as at least one fuel jet. The system may further include at least one Venturi duct disposed within the combustion chamber between the flame deck surface and the piston top surface, the at least one Venturi duct being disposed such that each of the at least one fuel jet, at least partially, enters the at least one Venturi duct structure upon being injected into the combustion chamber.

12 Claims, 5 Drawing Sheets

(56) References Cited

U.S. PATENT DOCUMENTS

| | | | | |
|---|---|---|---|---|
| 1,791,991 A | * | 2/1931 | Widmann | F02B 23/00 123/276 |
| 1,883,463 A | * | 10/1932 | Bagnulo | F02B 9/00 123/255 |
| 1,942,571 A | * | 1/1934 | Ricardo | F02B 23/00 123/51 BA |
| 2,001,536 A | * | 5/1935 | Lang | F01L 13/08 123/286 |
| 2,106,914 A | * | 2/1938 | Orange | F02B 13/02 123/275 |
| 2,121,813 A | * | 6/1938 | Mitchell | F02B 23/00 123/255 |
| 2,169,381 A | * | 8/1939 | Chapman | F02B 19/08 123/261 |
| 2,171,912 A | * | 9/1939 | Boxan | F02B 23/0672 123/263 |
| 2,173,081 A | * | 9/1939 | Barkeij | F02B 9/00 123/275 |
| 2,184,357 A | * | 12/1939 | Mallory | F02B 3/00 123/275 |
| 2,316,697 A | * | 4/1943 | Latta | F02M 69/00 123/262 |
| 2,497,374 A | * | 2/1950 | Rouy | F02B 19/14 123/262 |
| 2,827,883 A | * | 3/1958 | Goede | F02B 25/00 123/288 |
| 2,834,328 A | * | 5/1958 | Witzky | F02B 19/14 123/262 |
| 2,972,987 A | * | 2/1961 | Steidler | F02B 19/14 123/275 |
| 2,977,941 A | * | 4/1961 | Hockel | F02B 3/00 123/262 |
| 3,060,912 A | * | 10/1962 | May | F02B 19/06 123/143 A |
| 3,102,521 A | * | 9/1963 | Slemmons | F02M 69/00 123/263 |
| 3,168,079 A | * | 2/1965 | Henderson | F02B 19/14 123/263 |
| 3,283,751 A | * | 11/1966 | Goossak | F02B 19/1014 123/259 |
| 3,583,372 A | * | 6/1971 | Hoffmann | F02B 19/14 123/269 |
| 3,610,211 A | * | 10/1971 | Hoffmann | F02B 19/14 123/275 |
| 3,766,900 A | * | 10/1973 | Aiti | F02B 23/08 123/193.5 |
| 3,884,197 A | * | 5/1975 | Miyaki | F02B 19/1014 123/278 |
| 3,926,169 A | * | 12/1975 | Leshner | F02M 57/06 123/143 B |
| 4,026,250 A | * | 5/1977 | Funiciello | F02B 23/08 123/193.4 |
| 4,070,999 A | * | 1/1978 | Matsuno | F02B 19/04 123/260 |
| 4,162,664 A | * | 7/1979 | Fleming | F02M 49/00 123/259 |
| 4,258,680 A | * | 3/1981 | Eckert | F02B 23/02 123/254 |
| 4,336,780 A | * | 6/1982 | Sugiyama | F02M 7/106 123/437 |
| 4,440,125 A | * | 4/1984 | Case | F02B 19/14 123/263 |
| 4,862,857 A | * | 9/1989 | Donohue | F02B 61/045 123/534 |
| 4,920,937 A | * | 5/1990 | Sasaki | F02B 23/104 123/260 |
| 4,974,559 A | * | 12/1990 | Nagaoka | F02B 1/00 123/169 PA |
| 5,029,759 A | | 7/1991 | Weber | |
| 5,190,216 A | * | 3/1993 | Deneke | F02M 67/00 123/533 |
| 5,915,351 A | * | 6/1999 | Regueiro | F02B 19/16 123/254 |
| 6,553,960 B1 | | 4/2003 | Yoshikawa et al. | |
| 6,644,565 B2 | | 11/2003 | Hockenberger | |
| 8,544,770 B2 | | 10/2013 | Limmer et al. | |
| 8,677,950 B2 | * | 3/2014 | Hofbauer | F01B 7/08 123/306 |
| 8,869,770 B2 | | 10/2014 | Bazyn et al. | |
| 9,506,439 B2 | * | 11/2016 | Anders | F02B 23/00 |
| 2006/0191260 A1 | * | 8/2006 | Meyer | F01P 3/02 60/320 |
| 2011/0068188 A1 | * | 3/2011 | Laimboeck | F02B 23/0669 239/5 |
| 2012/0138712 A1 | | 6/2012 | Weber | |
| 2012/0186555 A1 | * | 7/2012 | Mueller | F02B 3/00 123/294 |
| 2014/0175192 A1 | | 6/2014 | Hou | |
| 2016/0097360 A1 | * | 4/2016 | Mueller | F02M 61/14 123/294 |
| 2016/0169086 A1 | * | 6/2016 | Svensson | F02B 23/02 123/294 |
| 2016/0298528 A1 | * | 10/2016 | Svensson | F02B 23/0669 |
| 2016/0298529 A1 | * | 10/2016 | Anders | F02B 23/0648 |
| 2016/0298531 A1 | * | 10/2016 | Anders | F02B 23/00 |
| 2016/0298583 A1 | * | 10/2016 | Anders | F02M 55/00 |
| 2016/0298584 A1 | * | 10/2016 | Svensson | F02B 23/0627 |
| 2016/0327000 A1 | * | 11/2016 | John | F02M 61/14 |
| 2017/0009712 A1 | * | 1/2017 | Svensson | F02M 31/20 |

FOREIGN PATENT DOCUMENTS

| | | |
|---|---|---|
| EP | 2112348 A2 | 10/2009 |
| FR | 2914358 A3 | 10/2008 |

* cited by examiner

DUCTED COMBUSTION SYSTEMS UTILIZING VENTURI DUCTS

TECHNICAL FIELD

The present disclosure generally relates to internal combustion engines and, more particularly, relates to ducted combustion systems for internal combustion engines.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct-injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in fuel/air mixtures are always desired, as such improvements may further reduce emissions and soot formation. Therefore, systems and methods for ducted combustion that utilize Venturi structures within the ducts, for improving fuel/air mixtures, are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including at least one orifice opening from an injector tip of the fuel injector, the at least one orifice injecting fuel into the combustion chamber as at least one fuel jet. The system may further include at least one Venturi duct structure disposed within the combustion chamber between the flame deck surface and the piston top surface, the at least one Venturi duct structure being disposed such that each of the at least one fuel jet, at least partially, enters the at least one Venturi duct structure upon being injected into the combustion chamber.

In accordance with another aspect of the disclosure, a method for operating a combustion system is disclosed. The method may including injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine. The method may further include directing the fuel jet into an opening of a duct, directing the fuel jet through a converging section of the duct, the converging section of the duct being proximate to the opening. The method may further include directing the fuel jet through a throat section of the duct, the throat section of the duct being downstream of the converging section. The method may further include directing the fuel jet through a diverging section of the duct, the diverging section of the duct being downstream of the throat section.

In accordance with yet another aspect of the disclosure, an internal combustion engine is disclosed. The internal combustion engine may include an engine block having at least one cylinder bore. The internal combustion engine may further include a cylinder head having a flame deck surface disposed at one end of the cylinder bore. The internal combustion engine may further include a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface. The internal combustion engine may further include a fuel injector in fluid connection with the combustion chamber and including at least one orifice opening from an injector tip of the fuel injector, the at least one orifice injecting fuel into the combustion chamber as at least one fuel jet. The internal combustion chamber may further include at least one Venturi duct structure disposed within the combustion chamber between the flame deck surface and the piston top surface, the at least one Venturi duct structure being disposed such that the at least one fuel jet, at least partially, enters the at least one duct upon being injected into the combustion chamber. The at least one Venturi duct structure may include a first section, a second section, and a throat section disposed between the first section and the second section Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
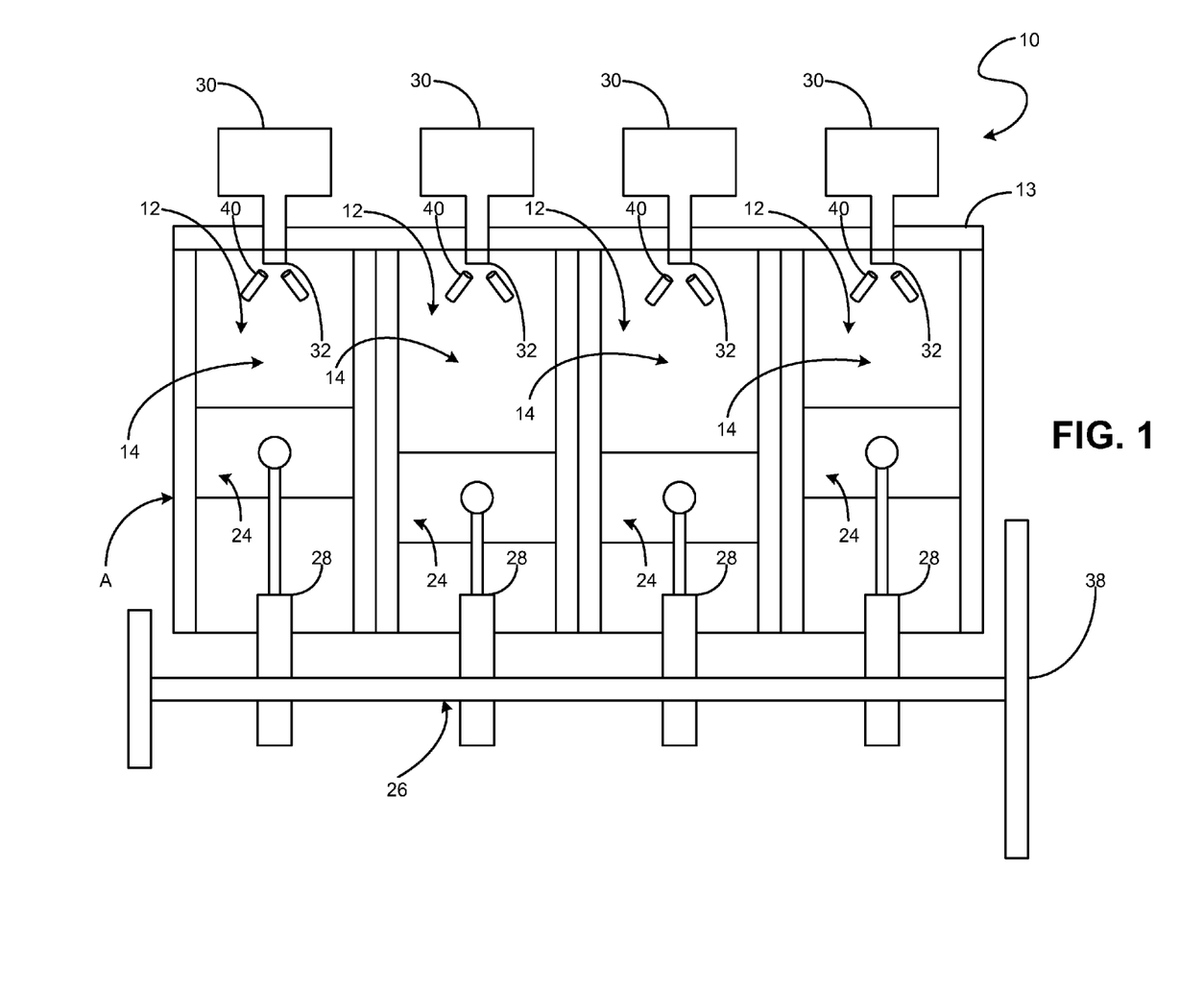
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
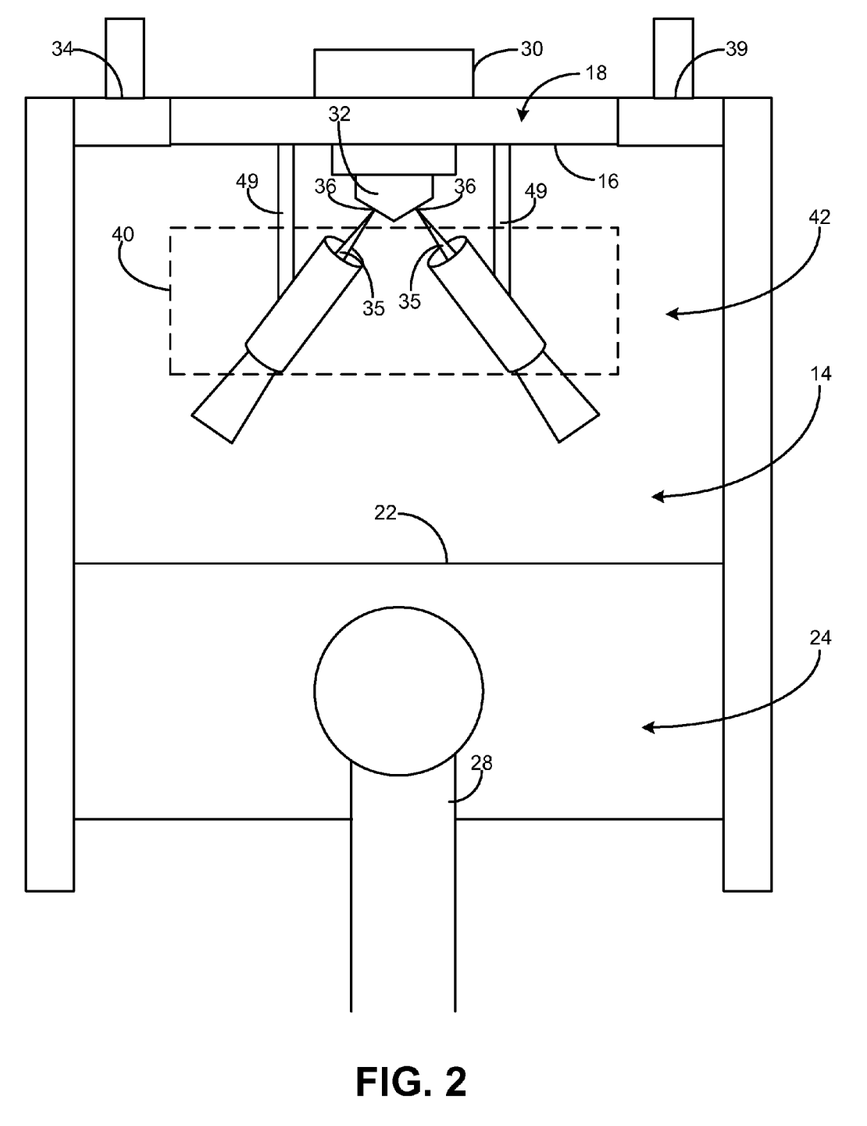
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes within the combustion chamber 14 through the flame deck surface 16. Therefore, the fuel injector 30, via the tip 32, can directly inject fuel into the combustion chamber 14 as, for example, one or more fuel jets.

During operation of the engine 10, air enters the combustion chamber 14 via one or more intake valves 34 (shown in FIG. 2). Air is able to enter the combustion chamber 14 when the air intake valves 34 are open, generally, during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 are open during an exhaust stroke and/or at the end of a power stroke and/or at the beginning of an intake stroke of the engine 10.

Within the combustion chamber 14, uniformity of the fuel/air mixture may be relevant to the combustion efficiency and may be relevant to the amount and type of combustion byproducts that are formed. For example, if the fuel/air mixture is too rich in fuel due to insufficient mixing within the fuel jets 35, then higher soot emissions may occur within the combustion chamber 14 and/or combustion efficiency may be affected. However, using one or more ducts 40 disposed within the combustion chamber 14 may provide for more uniform fuel/air mixing within the fuel jets 35. By using one or more ducts 40, a lift-off length of a flame associated with a fuel jet 35 may be altered (extended or reduced) to achieve an optimized lift-off length. The one or more ducts 40 may alter lift-off length due to energy exchange between the one or more ducts 40 and the fuel/air mixture of the fuel jet 35, due to altering fluid dynamics of the fuel/air mixture of the fuel jet 35, and/or due to prevention of lift-off length recession by acting as a flame arrester.

The one or more ducts 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
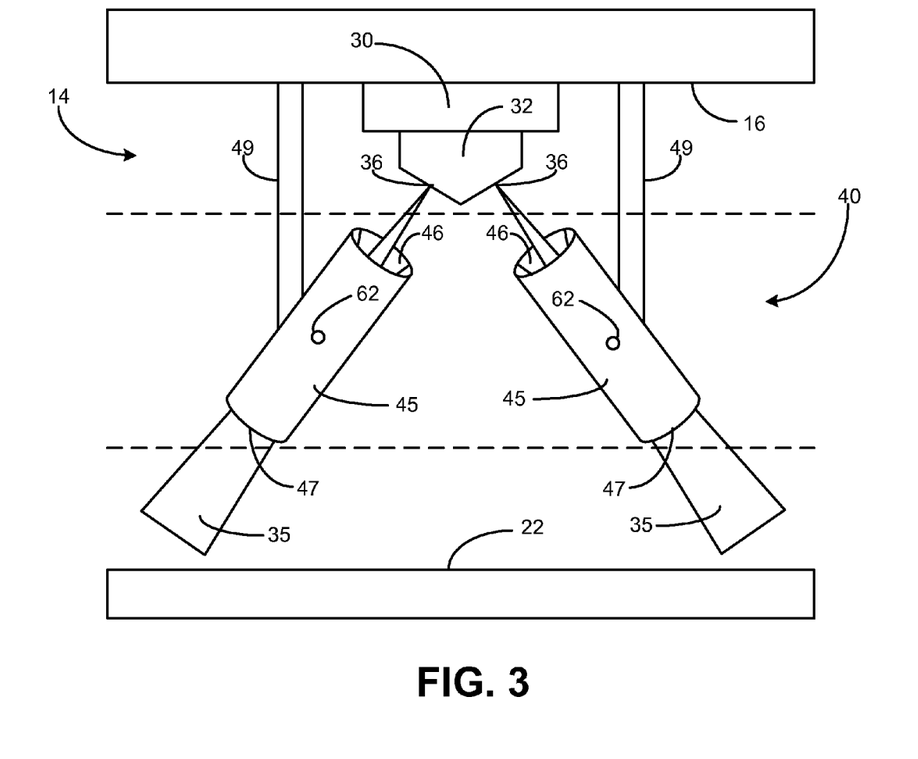
FIG. 3 is a side view of Venturi ducts for use within the cylinder(s) of FIGS. 1 and 2, in accordance with an embodiment of the disclosure.

To further illustrate the one or more ducts 40 and their interaction with one or more fuel jets 35 injected from the one or more orifices 36 of the tip 32 of the fuel injector 30, the ducts 40, within the combustion chamber 14, are shown in greater detail in FIG. 3. The one or more ducts 40 may be Venturi duct structures 45, as shown. Upon being injected out of the one or more orifices 36, the fuel jets 35 may, at least partially, enter the Venturi duct structures 45 at duct openings 46 and may flow through the ducts 40 to duct outlets 47. In some examples, the ducts 40 may be positioned and/or supported within the combustion chamber 14 by a support structure 49. The support structure 49 may be any mounting, wiring, or other positioning device suitable for positioning the ducts 40 within the combustion chamber 14.

Use of the ducts 40 may provide improved mixing of a fuel/air mixture within the fuel jets 35. The ducts 40 may direct combustion away from the fuel injector 30, such that longer flame lift-off lengths may be achieved. Further, by channeling the fuel jets 35 into the ducts 40, entrainment of combustion products from downstream regions of the same or neighboring fuel jets 35 may be inhibited or reduced. By using such ducts 40, levels of soot within the combustion chamber 14 may be reduced greatly.

Figure 4:
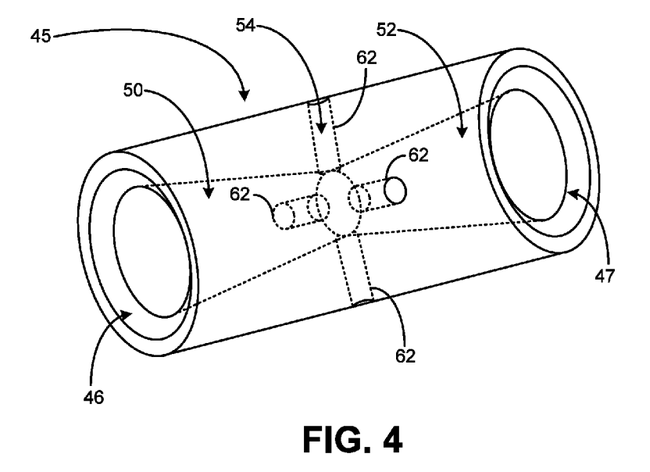
FIG. 4 is a three-dimensional side view of one of the Venturi ducts of FIG. 3, in accordance with the embodiment of FIG. 3 and the present disclosure.
Figure 5:
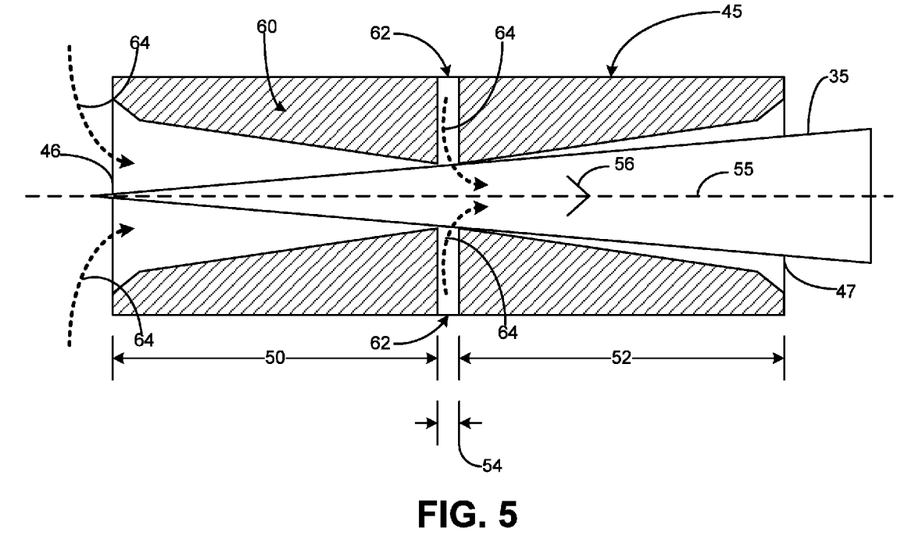
FIG. 5 is a side, cross-sectional view of the Venturi duct of FIG. 4, in accordance with the embodiment of FIGS. 3-4 and the present disclosure.

Additionally, improved fuel and air mixing may be achieved when Venturi duct structures 45 are used. An example of one of the Venturi duct structures 45 is shown in greater detail in the three-dimensional side view of FIG. 4, which has hollowed portions of the interior of the Venturi duct structure 45 denoted by dotted lines. A cross-sectional view of the example Venturi duct structure 45 of FIG. 4 is shown in FIG. 5. The Venturi duct structure 45 may include a first section 50, a second section 52, and a throat section 54 between the first section 50 and the second section 52.

In the drawings of FIGS. 4 and 5, lengths of the first section 50, the second section 52, and the throat section 54 are not shown in any particular scale. Lengths of the first section 50, second section 52, and throat section 54 may be any suitable lengths for performing the functions of the Venturi duct structure 45 as disclosed herein. In some examples, the first section 50 may have a longer length than the second section 52. Alternatively, in some examples, the second section 52 may have a longer length than the first section 50. Of course, the first section 50 and second section 52 may, alternatively, have substantially similar lengths.

As shown, the first section 50 may generally converge about an injection axis 55, which extends in a flow direction 56, of the fuel jet 35. "Converge about the injection axis in the flow direction," as defined herein with reference to duct structures, generally refers to a duct structure, or a portion thereof (e.g., first section 50), having a radius that decreases along the length of the duct structure about the injection axis 55 in the flow direction 56. Further, the second section 52 may generally diverge about the injection axis 55 of the fuel jet 35. "Diverge about the injection axis in the flow direction," as defined herein with reference to duct structures, generally refers to a duct structure having a radius that increases along the length of the duct structure, or a portion thereof (e.g., second section 52), about the injection axis 55 in the flow direction 56.

The throat section 54 is located between the first section 50 and the second section 52 and may have any suitable shape, so long as its radius is generally shorter than the radius of the opening 46. At the throat section 54, a duct wall 60 of the Venturi duct structure 45 may define one or more holes 62. Holes 62 are defined as any passage or multiple passages having any shape, number, and/or orientation for allowing fluid communication from the throat section 54 to the exterior of the Venturi duct structure 45. The holes 62 of the throat section 54 may draw ambient air 64 (denoted as dotted arrows) from, for example, the combustion chamber 14, in to the throat section 54. The ambient air 64, when drawn into the throat section 54, may provide for greater fuel and air mixing, in the fuel jet 35, throughout the Venturi duct structure 45.

The Venturi duct structure 45 can provide improved fuel and air mixing in the fuel jet 35 by utilizing the Venturi effect. In fluid mechanics, the Venturi effect is the reduction in fluid pressure that results when a fluid (e.g., the fuel jet 35) flows through a constricted section of a structure. In the example Venturi duct structure 45 of FIGS. 4 and 5, the fuel jet 35 enters the Venturi duct structure 45 at the opening 46 and enters the first section 50, which is generally converging in shape. Because the first section 50 is generally converging in shape, the fluid of the fuel jet 35 is thereby constricted as the fuel jet 35 flows through the first section 50 and into the throat section 54. As the first section 50 converges, the pressure of the fluid of the fuel jet 35 drops and the fluid velocity of the fuel jet 35 increases. Due to the pressure drop occurring at the constricted throat section 54, the ambient air 64 is drawn in to the throat section 54 via the one or more holes 62. By drawing in the ambient air 64, fuel and air mixing of the fuel jet 35 may be improved, while the fuel jet 35 passes through the Venturi duct structure 45. Use of Venturi duct structures 45 may also inhibit or reduce entrainment of recirculated combustion products from downstream regions into upstream regions of fuel jets 35 injected into the combustion chamber 14.

After passing through the throat section 54, the fuel jet 35 may then continue in to the second section 52, which is generally diverging in shape about the injection axis 55. Because the second section 52 is diverging in shape, the fuel jet 35 may widen and/or spread as the fuel jet 35 passes through the second section 52. By widening, the fuel jet 35 may have improved dispersion into the combustion chamber 14 as it exits the Venturi duct structure 45 via the duct outlet 47.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their related elements are useful in promoting a substantially uniform fuel/air mixture within fuel jets and may inhibit or reduce entrainment of recirculated combustion products from downstream regions into upstream regions of fuel jets injected into combustion chambers. Additionally, the duct systems above may be useful in providing enhanced fuel and air mixing within the fuel jets by employing the Venturi effect.

An example method 100 utilizing the ducted combustion systems shown in FIGS. 1-5 and described above is exemplified in the flowchart of FIG. 6, which represents a method 100 for operating a combustion system. The method 100 begins at block 110, by injecting a fuel jet 35 into the combustion chamber 14 of the internal combustion engine 10. The fuel jet 35 may be directed, at least partially, into the opening 46 of the Venturi duct structure 45, as shown in block 120. Continuing to flow through the Venturi duct structure 45, the fuel jet may then be directed through the first section 50 of the Venturi duct structure 45, as shown in block 130. Radii of the first section 50 may decrease in the flow direction 56, as the first section 50 may be converging in shape.

Figure 6:
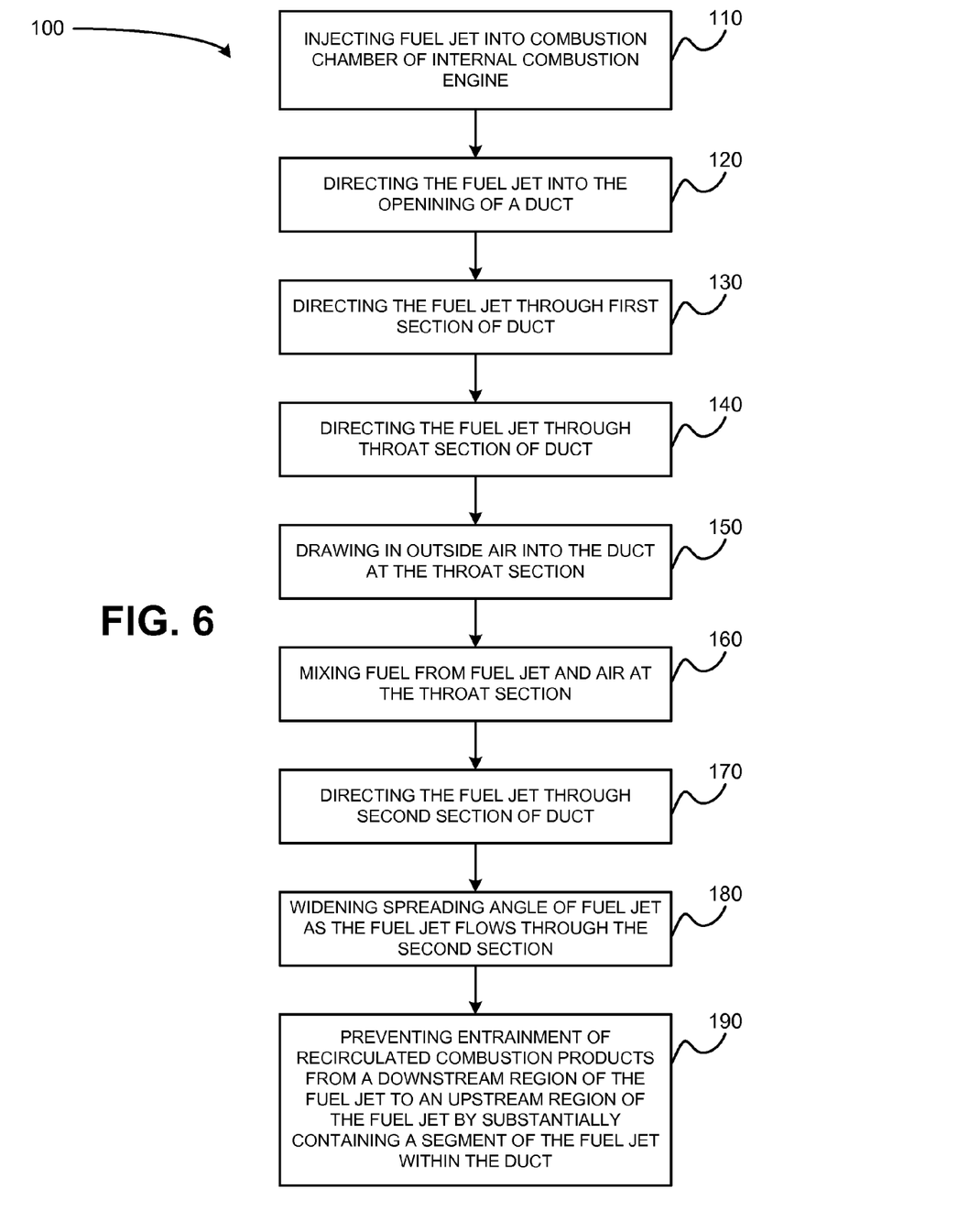
FIG. 6 is a block diagram of a flowchart representative of a method for operating a combustion system, in accordance with an embodiment of the disclosure.

After passing through the first section 50, the fuel jet 35 may be compressed, based on the converging shape of the first section 50, and then directed through the throat section 54 of the Venturi duct structure 45, as shown in block 140. At the throat section 54, the method 100 may further include drawing in ambient air 64 from the combustion chamber 14 into the Venturi duct structure 45 utilizing, for example, the holes 62, as shown in block 150. With ambient air 64 drawn into the Venturi duct structure 45, the ambient air 64 may be mixed with fuel of the fuel jet 35 at the throat section 54 to improve fuel and air mixing within the fuel jet 35, as shown in block 160.

The method 100 may continue by directing the fuel jet 35 from the throat section 54, through the second section 52 of the Venturi duct structure 45, as shown in block 170. Because the second section 52 is, generally, diverging in the flow direction 56 of the fuel jet 35, radii of the second section 52 may increase in the flow direction 56. Due to the divergence of the second section 52, the method 100 may further include widening the fuel jet 35 as the fuel jet 35 flows through the second section 52, as shown in block 180.

The disclosed ducted combustion systems may be configured to use the one or more ducts 40 to direct combustion away from the fuel injector tip 32, so that the equivalence ratio at the flame lift-off length, produced during combustion, is lower. Using the one or more ducts 40, greater uniformity of equivalence ratio within the fuel jets 35 may be achieved. Maintaining a reduced equivalence ratio at the lift-off length may reduce soot formation. Achieving a reduced equivalence ratio at the lift-off length may be accomplished by altering the lift-off length, when employing any of the aspects of the present application. Alterations to the lift-off length may occur based, in part, on the fuel and air mixture of the fuel jets 35, which may be optimized using the Venturi duct structures 45 described above. Additionally or alternatively, alterations to the lift-off length may be achieved by alteration of fuel jet fluid dynamics, which are resultant of characteristics of the Venturi duct structures 45.

At block 190, the method 100 may reduce entrainment of recirculated combustion products from a downstream region of the fuel jet 35 to an upstream region of the fuel jet 35 by substantially containing a segment of the fuel jet 35 within a duct 40. Reducing such entrainment may lead to an overall reduction in soot production within the combustion chamber 14 and may lead to greater overall efficiency of the internal combustion engine 10. Presence of ducts 40 may alter amount and position of entrainment of recirculated combustion products, within the fuel jets 35.

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
    a combustion chamber defined as an enclosure bound at a first end by a flame deck surface of a cylinder head of an internal combustion engine, and bound at a second end by a piston top surface of a piston disposed within the internal combustion engine, and forming a cylindrical bore in which a main combustion event occurs which provides work on the piston;
    a fuel injector in fluid connection with the combustion chamber and including at least one orifice opening from an injector tip of the fuel injector, the at least one orifice injecting fuel into the combustion chamber as at least one fuel jet; and
    at least one Venturi duct structure disposed totally within the combustion chamber between the flame deck surface and the piston top surface and being disposed such that the at least one fuel jet, at least partially, enters a duct opening of the at least one Venturi duct structure upon being injected into the combustion chamber, and exits a duct outlet of the at least one Venturi duct structure, wherein the at least one Venturi duct structure defines a first section, a second section, and a throat section disposed between the first section and the second section, and wherein a wall of the Venturi duct structure defines one or more holes at the throat section, the one or more holes being configured to draw ambient air from the combustion chamber into the at least one fuel jet as the at least one fuel jet passes through the throat section.

2. The ducted combustion system of claim 1, wherein the at least one fuel jet enters the first section at an opening of the at least one Venturi duct structure and the at least one fuel jet exits the at least one Venturi duct structure through the second section.

3. The ducted combustion system of claim 1, wherein first section is generally converging in shape and converges in a flow direction of the at least one fuel jet.

4. The ducted combustion system of claim 1, wherein the second section is generally diverging and diverges in a flow direction of the at least one fuel jet.

5. The ducted combustion system of claim 1, wherein the first section is greater, in length, than the second section.

6. The ducted combustion system of claim 1, wherein the second section is greater, in length, than the first section.

7. A method for operating a combustion system, comprising:
    injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine, and forming a cylindrical bore in which a main combustion event occurs which provides work on the piston;
    directing the fuel jet into an opening of a duct, the duct being disposed totally within the combustion chamber between the flame deck surface and the piston top surface;
    directing the fuel jet through a converging section of the duct, the converging section of the duct being proximate to the opening;
    directing the fuel jet through a throat section of the duct, the throat section of the duct being downstream of the converging section;
    drawing in outside air from the combustion chamber into the duct at the throat section via one or more holes defined by a wall of the duct proximate to the throat section;
    mixing fuel of the fuel jet and the outside air from the combustion chamber at the throat section of the duct; and
    directing the mixed fuel jet through a diverging section of the duct and through a duct outlet, the diverging section of the duct being downstream of the throat section.

8. The method of claim 7, further comprising preventing entrainment of recirculated combustion products from a downstream region of the fuel jet to a upstream region of the fuel jet by substantially containing a segment of the fuel jet within the duct.

9. The method of claim 7, wherein directing the fuel jet through a converging section of the duct includes directing the fuel jet through the converging section in a flow direction of the fuel jet, wherein radii of the converging section decrease in the flow direction.

10. The method of claim 7, wherein directing the fuel jet through the diverging section of the duct includes directing the fuel jet through the diverging section in a flow direction of the fuel jet, wherein radii of the diverging section increase in the flow direction.

11. An internal combustion engine, comprising:
    an engine block having at least one cylinder bore;
    a cylinder head having a flame deck surface disposed at one end of the cylinder bore;
    a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface, and forming a cylindrical bore in which a main combustion event occurs which provides work on the piston;
    a fuel injector in fluid connection with the combustion chamber and including at least one orifice opening from an injector tip of the fuel injector, the at least one orifice injecting fuel into the combustion chamber as at least one fuel jet; and
    at least one Venturi duct structure disposed totally within the combustion chamber between the flame deck surface and the piston top surface, the at least one Venturi duct structure being disposed such that the at least one fuel jet, at least partially, enters a duct opening of the at least one Venturi duct structure upon being injected into the combustion chamber, and exits a duct outlet of the at least one Venturi duct structure, the at least one Venturi duct structure including a first section, a second section, and a throat section disposed between the first section and the second section, wherein a wall of the at least one Venturi duct structure defines one or more holes at the throat section.

12. The internal combustion engine of claim 11, wherein the first section has a generally converging shaped structure, the generally converging shaped structure converging in a flow direction of the at least one fuel jet, and wherein the second section has a generally diverging shaped structure, the generally diverging shaped structure diverging in a flow direction of the at least one fuel jet.

* * * * *